United States Patent Office 3,015,758
Patented Jan. 2, 1962

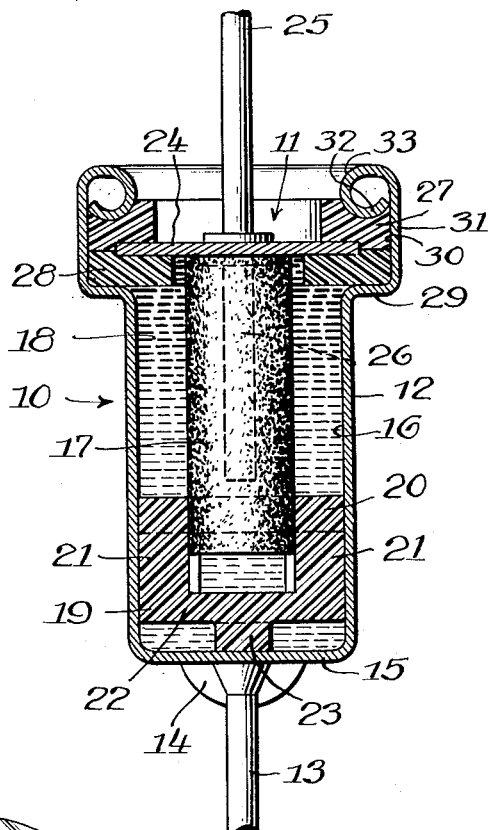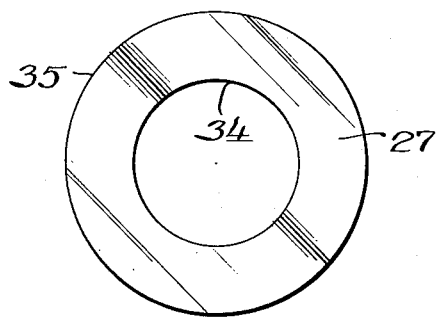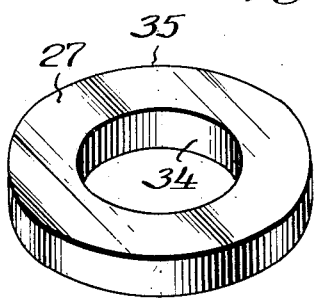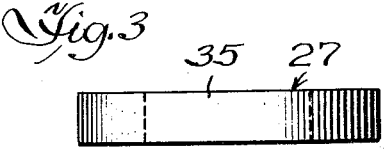
Inventors,
Robert R. Walters,
Ralph J. Hovey
and Robert A. Hildebrandt
By: Schneider, Dressler & Goldsmith,
Attys.

3,015,758
ELECTROLYTIC CAPACITOR
Robert A. Hildebrandt, Arlington Heights, Ralph J. Hovey, Glen Ellyn, and Robert R. Walters, Plainfield, Ill., assignors to Fansteel Metallurgical Corporation, a corporation of New York
Filed Sept. 20, 1957, Ser. No. 685,289
2 Claims. (Cl. 317—230)

The present invention relates to an electrolytic capacitor and more particularly to an electrolytic capacitor of the liquid electrolyte type having a porous metal anode.

An illustrative embodiment of the invention is a capacitor in which aqueous electrolyte such as sulphuric acid or lithium chloride is contained in a metallic can or container-shaped casing which forms the cathode of the capacitor. The anode of the capacitor is preferably porous and constructed from a film-forming metal such as tantalum. The anode is supported concentrically within the cathode.

A plate, also made of tantalum, is welded to the top of the porous tantalum anode and co-operates with a shoulder formed at the flared open end of the capacitor case to support the anode concentrically within the case and out of contact with it. The plate rests between a pair of sealing washers or gaskets so that it is out of electrical contact with the case.

Heretofore, the sealing washers and gaskets were usually made from synthetic or natural rubber or similar materials composed of relatively simple hydrocarbon molecules that had been polymerized to form large, complex molecules in the form of chains. Because of the carbon-hydrogen bonds in these rubber materials, which bonds can be oxidized with comparative ease, such materials were quite susceptible to oxidizing agents such as the sulphuric acid fill electrolyte used in the capacitors. As a result, when these materials were used as sealing materials for capacitors of this type, they had a short life and did not provide an effective seal.

Another difficulty attending the use of natural and synthetic rubber-like materials was that these materials require the use of re-enforcing fillers, such as carbon black, which impart desirable physical properties to the rubber. The filler materials, however, are detrimental to the electrical properties of the rubber and serve to cause short circuits and low resistance leakage paths.

Still another difficulty attending the use of these materials resulted from the mismatching of the mechanical vibration characteristics of these materials when used as sealing washers and gaskets and base supports provided within the containers at the closed bottom end thereof for the lower end of the porous anode. The base support has been formed of a material such as Teflon, a product available from E. I. du Pont de Nemours & Co., which is inert to the electrolyte. The shape of the base support is such that it holds the lower end of the tantalum anode out of contact with the case but permits substantially free circulation of electrolyte about the lower end of the anode.

Mismatching of the mechanical vibration characterisitcs of the base support and the sealing washers and gaskets is an important source of difficulty with these capacitors since these differences could cause cracking of the brittle, sintered anode. In accordance with this invention the vibration characteristics of all of these elements are matched whereby this problem is avoided.

Another difficulty accompanying the use of synthetic and natural rubber and rubber-like materials for sealing gaskets and washers resulted from the small temperature range in which these materials were sufficiently resilient to provide a good seal. Devices of this type are used in installations such as aircraft where the temperature range may be as great as from about −75° C. to about +250° C. While the working and operating temperature range of the capacitor is normally from about −65° C. to about +125° C., it is important that the sealing members retain a substantially uniform resilience over a substantially larger temperature range than the normal working range so that extraordinary working conditions do not destroy the capacitor.

In accordance with the present invention all of these difficulties are obviated and there is provided a capacitor having matched base support elements and sealing elements that are electrically insulating, provide an effective seal over a wide range of temperatures and are inert to the electrolyte materials so that the capacitor may have a long life in use as well as on the shelf.

The exemplary embodiment of the present invention described herein below in conjunction with the accompanying drawings is a capacitor in which the plate welded to the tantalum anode is sealed between a gasket and a washer made of such materials as saturated fluorocarbon copolymers that are matched for resiliency with each other and with the base support. These elastomer elements are operative to seal the capacitor over a wide range of temperatures, are inert to the electrolyte and provide effective insulation between the anode and the cathode.

Numerous features and advantages of the present invention will become readily apparent to those skilled in the art and others from the following detailed description of an illustrative embodiment of the invention, from the claims and from the accompanying drawings in which every detail shown is fully and completely disclosed as a part of this specification, in which like reference numerals refer to like parts, and in which:

FIGURE 1 is a full sectional view of a capacitor embodying the principles of this invention; and FIGURES 2, 3 and 4 are various views of one of the sealing elements used in the capacitor of FIGURE 1.

An electrolytic capacitor 10 embodying the principles of this invention is shown in FIGURE 1 in detail. The capacitor 10 has an anode assembly 11 disposed substantially concentrically within a can-shaped, substantially cylindrical case 12. The case 12 is formed of a conductive material such as silver and operates as the cathode for the capacitor. A cathode lead 13 is soldered or welded, as at 14, to the bottom 15 of the case.

The space in the case between the inside surface 16 thereof and the porous, sintered, substantially cylindrical tantalum anode 17 of the anode assembly 11 is filled with an aqueous electrolyte 18 such as 55 percent solution of sulphuric acid. At the lower end of the sintered tantalum anode, and within the case 12, there is provided a base support 19 for the anode. This support, preferably formed from a material such as Teflon, has an annular washer-like rim 20 surrounding the anode adjacent to the lower end thereof to maintain the anode out of contact with the side of the case. The rim 20 is supported by a pair of upstanding legs 21 connected together at their lower end by a cross tie 22 below which there extends a standoff button 23 that abuts the bottom wall 15 of the case. The base support 19 is preferably molded as a one-piece element that is fitted into the bottom of the case to receive the anode.

The anode assembly 11 includes the porous, sintered anode element 17, a transverse tantalum plate 24 welded to the top thereof and a pair of lead pins 25 and 26 secured to the plate and the anode element. In the manufacture of this assembly, the pins 25 and 26 are welded to the plate 24. Powdered tantalum is then sintered about the pin 26 in such a manner that the anode element 17 is appropriately shaped and welded to the pin 26 and to one surface of the plate 24. The pin 25 may then serve as an anode lead for the capacitor. After sintering, the anode element 17 is anodically formed to provide an oxide film on the element.

The anode assembly 11 is supported within the case 12 by a sealing gasket 27 and a sealing washer 28 that cooperatively clamp the outer portion of the plate 24 therebetween and rest upon a flared shoulder 29 on the case near the upper, open end of the capacitor. The washer 28 rests directly on the shoulder 29 and tightly fits against the inner surface 30 of the portion 31 of the case that extends upwardly from the shoulder 29. The plate 24 rests on top of the washer and overlaps the same. An outer gasket 27 overlies the outer annular portion of the plate 24 and the washer 28 and also fits snugly against the face 30 of the upstanding portion 31 of the case.

When the capacitor is assembled with the parts in position as described above and filled with electrolyte, the upper edge 32 of the case is crimped or swedged inwardly and downwardly to form a rolled edge 33 that forcibly clamps down against the gasket 27, and clamps the gasket against the plate 24 and the washer 28, thus closing and tightly sealing the capacitor.

The gasket 27 is shown in enlarged detailed views in FIGURES 2, 3 and 4 wherein it is seen that the gasket is an annular member having concentric annular inner and outer faces 34 and 35, respectively. The outer diameter of the gasket is large enough to provide the gasket with a snug fit in the upper portion 31 of the case 12. The inner diameter of the gasket 27 is such that the body of the gasket substantially overlaps the outer peripheral portion of the plate 24 of the capacitor anode assembly 11.

The gasket 27 is preferably formed of a material such as Kel–F, a product available from M. W. Kellogg Co. of Newark, N.J., and is essentially a fully saturated fluorocarbon copolymer of chlorotrifluoroethylene and vinylidene fluoride. Methylene groups are incorporated into the normally rigid, highly fluorinated polymer chains to provide elasticity and resiliency. Attack of the elastomer gasket by oxidizing agents is extremely negligible because of the extreme chemical stability of the carbon-fluorine bonds contained in the material. This provides the element with good thermal characteristics. Since the gasket has the ability to crystalize on stretching, the need for reinforcing fillers that are detrimental to the elecrical properties of the capacitor is voided.

The gasket also properly matches the washer 28 and base support 21, both of which may be made from Teflon, so that the mechanical vibration characteristics are matched and highly effective seals are provided.

Capacitors made in accordance with this invention have been operated at temperatures of about −70° C. in a vacuum of approximately 1 mm. of mercury for 350 hours with no significant loss in weight, signifying no loss of electrolyte through the seal, and with no significant change in electrical characteristics. Capacitors embodying this invention have also been operated at temperatures well in excess of +125° C. for periods up to 1500 hours at voltages up to about 125 volts D.C.

It has also been determined that capacitors of this type, embodying this invention and provided with an electrolyte of 55 percent sulphuric acid have a long life with substantially no deterioration of the seal.

It is understood, of course, that numerous modifications and variations may be effected without departing from the true spirit and scope of the novel concepts and principles of this invention.

We claim:

1. An electrolytic capacitor comprising a can-shaped cathode, a porous anode concentrically arranged in said cathode, an anode support seated in said container-shaped cathode supportingly engaging the lower end of said anode and formed of a material inert to said electrolyte, a shoulder on said cathode, a plate secured to the upper end of said anode, a washer on said shoulder and supporting said plate, a gasket overlying said plate and said washer, and means at the end of said cathode clamping said gasket and said plate and said washer together to provide a seal between said cathode and said anode, said gasket and said washer being formed of materials having matching mechanical characteristics with said anode support and being inert to said electrolyte in a temperature range of from about −75° C. to about +250° C.

2. An electrolytic capacitor comprising a can-shaped cathode, a porous anode concentrically arranged in said cathode, an anode support seated in said container-shaped cathode supportingly engaging the lower end of said anode and formed of a fully saturated fluorocarbon copolymer, a shoulder on said cathode, a plate secured to the upper end of said anode, a washer on said shoulder and supporting said plate, a gasket overlying said plate and said washer, and means at the end of said cathode clamping said gasket and said plate and said washer together to provide a seal between said cathode and said anode, said gasket and said washer being formed of a fully saturated fluorocarbon copolymer having matching mechanical characteristics with said anode support.

References Cited in the file of this patent

UNITED STATES PATENTS

| | | |
|---|---|---|
| 2,710,369 | Booe | June 7, 1955 |
| 2,744,217 | Aikman | May 1, 1956 |
| 2,825,855 | Frekko | Mar. 4, 1958 |
| 2,834,926 | Booe | May 13, 1958 |